(12) United States Patent
Nelson

(10) Patent No.: US 10,362,117 B1
(45) Date of Patent: Jul. 23, 2019

(54) SYSTEMS AND METHODS FOR MODIFIED NETWORK ROUTING BASED ON MODAL INFORMATION

(71) Applicant: Rockwell Collins, Inc., Cedar Rapids, IA (US)

(72) Inventor: Brent J. Nelson, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 50 days.

(21) Appl. No.: 15/636,405

(22) Filed: Jun. 28, 2017

(51) Int. Cl.
  *H04L 29/08* (2006.01)
  *H04L 12/707* (2013.01)
  *H04L 12/717* (2013.01)
  *H04L 12/741* (2013.01)
  *H04W 40/24* (2009.01)
  *H04L 12/759* (2013.01)

(52) U.S. Cl.
  CPC .............. *H04L 67/12* (2013.01); *H04L 45/24* (2013.01); *H04L 45/42* (2013.01); *H04L 45/028* (2013.01); *H04L 45/54* (2013.01); *H04W 40/248* (2013.01)

(58) Field of Classification Search
  CPC ......... H04L 67/12; H04L 45/24; H04L 45/42; H04L 45/028; H04L 45/54; H04W 40/248
  See application file for complete search history.

(56) References Cited

U.S. PATENT DOCUMENTS

| | | | | |
|---|---|---|---|---|
| 5,093,824 A * | 3/1992 | Coan | ................... | H04J 3/085 370/228 |
| 5,235,599 A * | 8/1993 | Nishimura | .......... | G06F 11/2007 340/2.23 |
| 5,500,860 A * | 3/1996 | Perlman | ............... | H04L 12/4625 370/401 |
| 5,859,959 A * | 1/1999 | Kimball | ............... | G06F 11/2007 370/216 |
| 6,356,546 B1 * | 3/2002 | Beshai | .................. | H04L 45/302 370/358 |
| 6,356,622 B1 * | 3/2002 | Hassell | ..................... | H04M 3/12 379/1.01 |
| 6,580,721 B1 * | 6/2003 | Beshai | ..................... | H04L 47/10 370/395.2 |
| 6,738,345 B1 * | 5/2004 | Williamson | ............... | H04L 1/22 370/217 |
| 7,139,928 B1 * | 11/2006 | Bhattacharya | ........ | H04L 49/557 714/4.4 |
| 7,174,456 B1 * | 2/2007 | Henry | ................. | H04L 63/0428 713/158 |
| 7,447,149 B1 * | 11/2008 | Beesley | .................. | H04L 45/22 370/217 |
| 7,630,302 B2 * | 12/2009 | Taylor | ..................... | H04L 43/00 370/228 |

(Continued)

*Primary Examiner* — Tejis Daya
(74) *Attorney, Agent, or Firm* — Donna P. Suchy; Daniel M. Barbieri

(57) ABSTRACT

A network interface devices includes a configuration engine, a mode modification engine, and a switch. The configuration engine defines a static routing configuration for communicating one or more first data packets received from a first processing circuit along a network pathway to a predetermined one or more second processing circuits. The mode modification engine is configured to receive an indication of a networking mode and modify the network pathway based on the indication of the networking mode. The switch is configured to communicate the first data packets along the network pathway.

17 Claims, 10 Drawing Sheets

(56) References Cited

U.S. PATENT DOCUMENTS

| | | | | |
|---|---|---|---|---|
| 7,827,307 | B2 * | 11/2010 | Lehrschall | H04L 29/06027 709/224 |
| 8,965,197 | B2 * | 2/2015 | Shirai | H04B 10/275 398/1 |
| 9,038,151 | B1 * | 5/2015 | Chua | H04L 45/02 709/223 |
| 9,577,742 | B1 * | 2/2017 | Bantoft | H04B 7/18584 |
| 9,577,797 | B1 * | 2/2017 | Pomeroy | H04L 61/103 |
| 10,095,535 | B2 * | 10/2018 | Dubey | G06F 9/45558 |
| 2001/0046227 | A1 * | 11/2001 | Matsuhira | H04L 45/00 370/355 |
| 2003/0018591 | A1 * | 1/2003 | Komisky | H04L 45/00 706/1 |
| 2003/0117959 | A1 * | 6/2003 | Taranov | H04L 43/50 370/241 |
| 2005/0091383 | A1 * | 4/2005 | Bender | H04L 67/1097 709/228 |
| 2006/0002292 | A1 * | 1/2006 | Chang | H04L 12/462 370/225 |
| 2007/0263532 | A1 * | 11/2007 | Mirtorabi | H04J 3/14 370/228 |
| 2008/0263397 | A1 * | 10/2008 | Lutz | H04L 43/50 714/25 |
| 2009/0016336 | A1 * | 1/2009 | LaVigne | H04L 47/10 370/389 |
| 2009/0187976 | A1 * | 7/2009 | Perroud | H04B 7/18506 726/4 |
| 2010/0271933 | A1 * | 10/2010 | Li | H04L 45/00 370/219 |
| 2011/0199976 | A1 * | 8/2011 | Mitchell | H01Q 1/007 370/328 |
| 2013/0216236 | A1 * | 8/2013 | Bolberov | H04B 10/40 398/135 |
| 2013/0298228 | A1 * | 11/2013 | Smith | H04L 63/0414 726/22 |
| 2017/0195210 | A1 * | 7/2017 | Jacob | H04L 12/4625 |

* cited by examiner

SYSTEMS AND METHODS FOR MODIFIED NETWORK ROUTING BASED ON MODAL INFORMATION

BACKGROUND

The inventive concepts disclosed herein relate generally to the field of avionics systems. More particularly, embodiments of the inventive concepts disclosed herein relate to systems and methods for modified network routing based on modal information.

As aircraft electronics become increasingly connected, many avionics systems are using network communications, particularly Ethernet-based networks, for high speed communications between a large variety of devices. Network connections can use configurable routing of data through the networks (e.g., ARINC 664 networks) to establish installations and options for how the data moves from source devices to destination devices. However, within a given configuration, the routing is static, which may be provide security and performance benefits when the avionics systems are initially networked, but cannot be changed or disabled without a network configuration change that could require a dataload or a reset to load.

SUMMARY

In one aspect, the inventive concepts disclosed herein are directed to a network interface device. The network interface device includes a configuration engine, a mode modification engine, and a switch. The configuration engine defines a static routing configuration for communicating one or more first data packets received from a first processing circuit along a network pathway to a predetermined one or more second processing circuits. The mode modification engine is configured to receive an indication of a networking mode and modify the network pathway based on the indication of the networking mode. The switch is configured to communicate the first data packets along the network pathway.

In a further aspect, the inventive concepts disclosed herein are directed to an airborne platform. The airborne platform includes a first processing circuit, a plurality of second processing circuits, and a network interface device. The first processing circuit is configured to generate one or more first data packets. The network interface device includes a configuration engine, a mode modification engine, and a switch. The configuration engine defines a static routing configuration for communicating one or more first data packets received from a first processing circuit along a network pathway to a predetermined one or more second processing circuits. The mode modification engine is configured to receive an indication of a networking mode and modify the network pathway based on the indication of the networking mode. The switch is configured to communicate the first data packets along the network pathway.

In a further aspect, the inventive concepts disclosed herein are directed to a method. The method includes receiving an indication of a networking mode. The method includes modifying a network pathway of a static routing configuration for communicating first data packets from a first processing circuit to a predetermined one or more second processing circuits based on the indication of the networking mode. The method includes communicating the first data packets along the modified network pathway.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
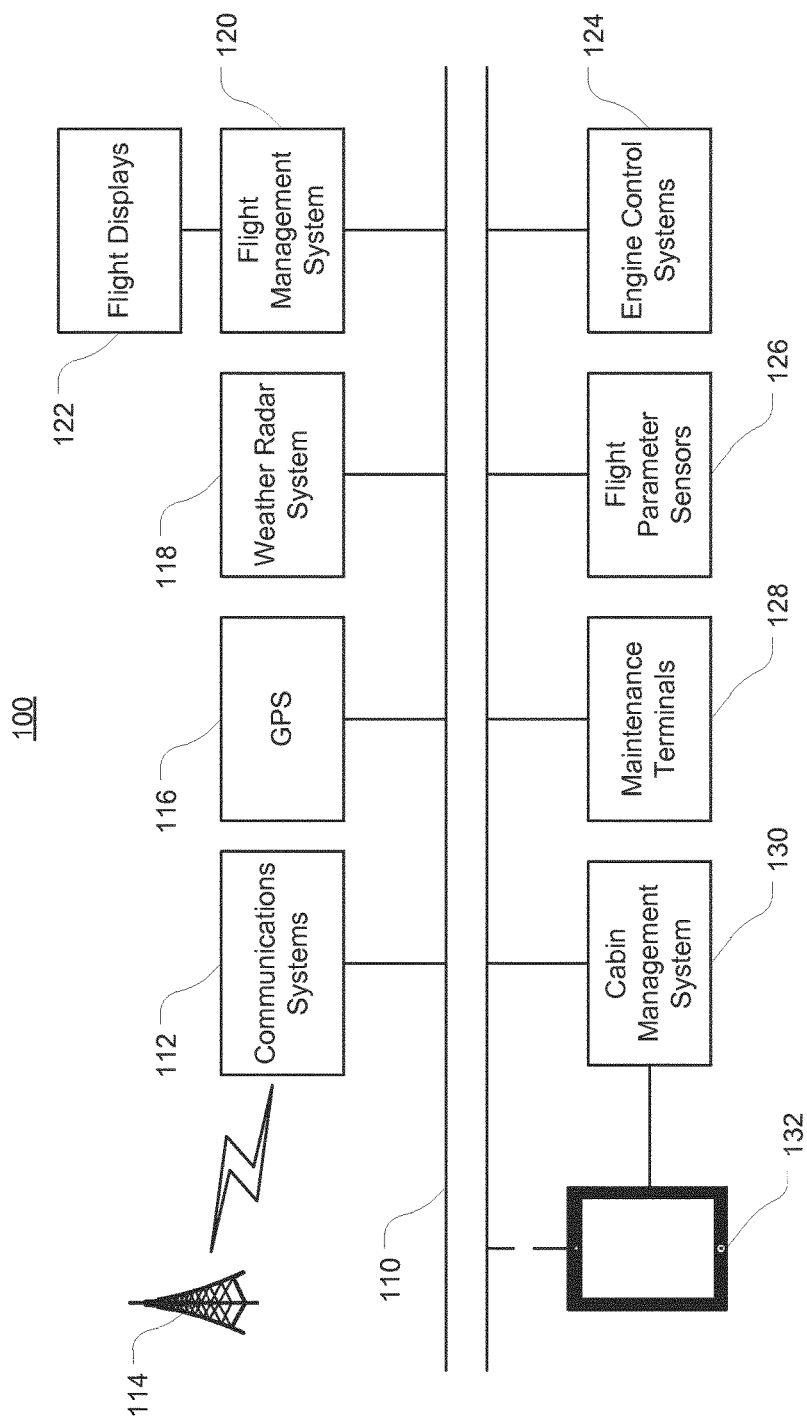
FIG. 1 is a schematic diagram of an exemplary embodiment of an aircraft electronic communication network according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for modified network routing based on modal information, such as for modifying routing based on a physical state or an airborne platform or based on failures in electronic devices using the network of the airborne platform. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a network interface device includes a configuration engine, a mode modification engine, and a switch. The configuration engine defines a static routing configuration for communicating one or more first data packets received from a first processing circuit along a network pathway to a predetermined one or more second processing circuits. The mode modification engine is configured to receive an indication of a networking mode and modify the network pathway based on the indication of the networking mode. The switch is configured to communicate the first data packets along the network pathway.

The network interface device can be integrated with an airborne platform or other platform as described herein. For example, the routing modification described herein can be associated with avionics controllers or other critical electronic devices, such as those in an aircraft cockpit or control center, of the airborne platform.

Systems manufactured in accordance with the inventive concepts disclosed herein can improve the operation of aircraft and other platforms by enabling existing avionics systems and network communication devices to operate with improve resource allocation efficiency, secure high integrity, trusted, or other critical systems from rogue or faulty Ethernet-based communications, provide network determinism, and otherwise facilitate more flexible routing of data packets through static network configurations. Static routing configurations can improve the operation of avionics networking systems by supporting a deterministic system that has guaranteed behaviors. Based on the static routing configuration, the system configuration can be analyzed at design time rather than during runtime; additionally, the behavior of the system can be more predictable when it is based on a predefined routing table rather than determined at runtime, especially in the presence of faults or security threats. As such, the inventive concepts disclosed herein allow for static routing configurations to be used while also facilitating network modifications as described herein and other improvements.

Referring now to FIG. 1, a schematic diagram of an aircraft electronic communication network 100 is shown according to an exemplary embodiment of the inventive concepts disclosed herein. The aircraft electronic communication network 100 includes a network interface device 110, which can receive incoming electronic transmissions (e.g., data packets, Ethernet frames) from various electronic devices directly or indirectly connected to the network interface device 110, and route the incoming transmissions to appropriate destination electronic devices based on a network configuration.

In some embodiments, such as shown in FIG. 1, the aircraft electronic communication network 100 may include one or more devices configured to transmit and receive electronic transmissions using the network interface device 110. For example, the aircraft electronic communication network 100 may include communications systems 112 (e.g., transmitter/receiver electronics), such as a datalink, which may be configured to communicate with remote devices such as ground station 114, satellites, or other platforms (e.g., aircraft). The aircraft electronic communication network 100 may include navigation systems, such as a GPS receiver 116, a GNSS system, or other navigation systems. The aircraft electronic communication network 100 may include a weather radar system 118. The aircraft electronic communication network 100 may include a flight management system 120, which may be provided in an aircraft cockpit or control center, such as for receiving user inputs for controlling operation of various aircraft electronics. The flight management system 120 may be configured to control operation of flight displays 122, such as primary flight displays configured to display high integrity information to a pilot and/or co-pilot. The aircraft electronic communication network 100 may include various engine control systems 124 configured to control operation of aircraft engines (e.g., throttle control, aircraft control surface control, autoflight systems such as autothrottle or autopilot). The aircraft electronic communication network 100 may include flight parameter sensors 126, such as an inertial measurement unit (which may include one or more gyroscopes and one or more accelerometers, such as three gyroscopes and three accelerometers), an air data sensor (e.g., sensor(s) configured to detect and output an indication of static pressure), a magnetic compass, or a vision system (e.g., camera, infrared image sensor, LIDAR). The aircraft electronic communication network 100 may include maintenance terminal(s) 128, which can be configured to receive and/or execute testing and maintenance applications on various components of the airborne platform. The aircraft electronic communication network 100 can include a cabin management system 130 configured to control operation of cabin electronics (e.g., lights, entertainment devices). The aircraft electronic communication network 100 may be configured to connect portable electronic devices 132 (e.g., commercial off the shelf electronic devices, personal electronic devices) to the network interface device 110 directly or via the cabin management system 130. Various other electronic devices may be configured to communicate with the network interface device 110.

It will be appreciated that certain data flows between the devices of the aircraft communication network 100 may be static (e.g., predetermined, standard), such as for communicating flight parameter data from flight parameter sensors 126 to the flight management system 120 or engine control systems 124. However, in various embodiments, routing of data between various devices may be improved by enabling modifications to the static routing configurations of the network interface device 110 without requiring a dataload or reset to load.

In addition, it will be appreciated that the various devices 112-132 may have varying levels of integrity (e.g., fault rates or error rates as compared to regulatory requirements for aircraft electronics, security risks, authorization to access other devices on the aircraft electronic communication network 100), such that operation of the network 110 may be improved by protecting relatively high integrity devices from being affected by potential security risks from relatively low integrity devices, or devices which may be more likely to be exposed to security threats (e.g., devices configured to communicate with commercial off the shelf personal electronic devices).

Figure 2:
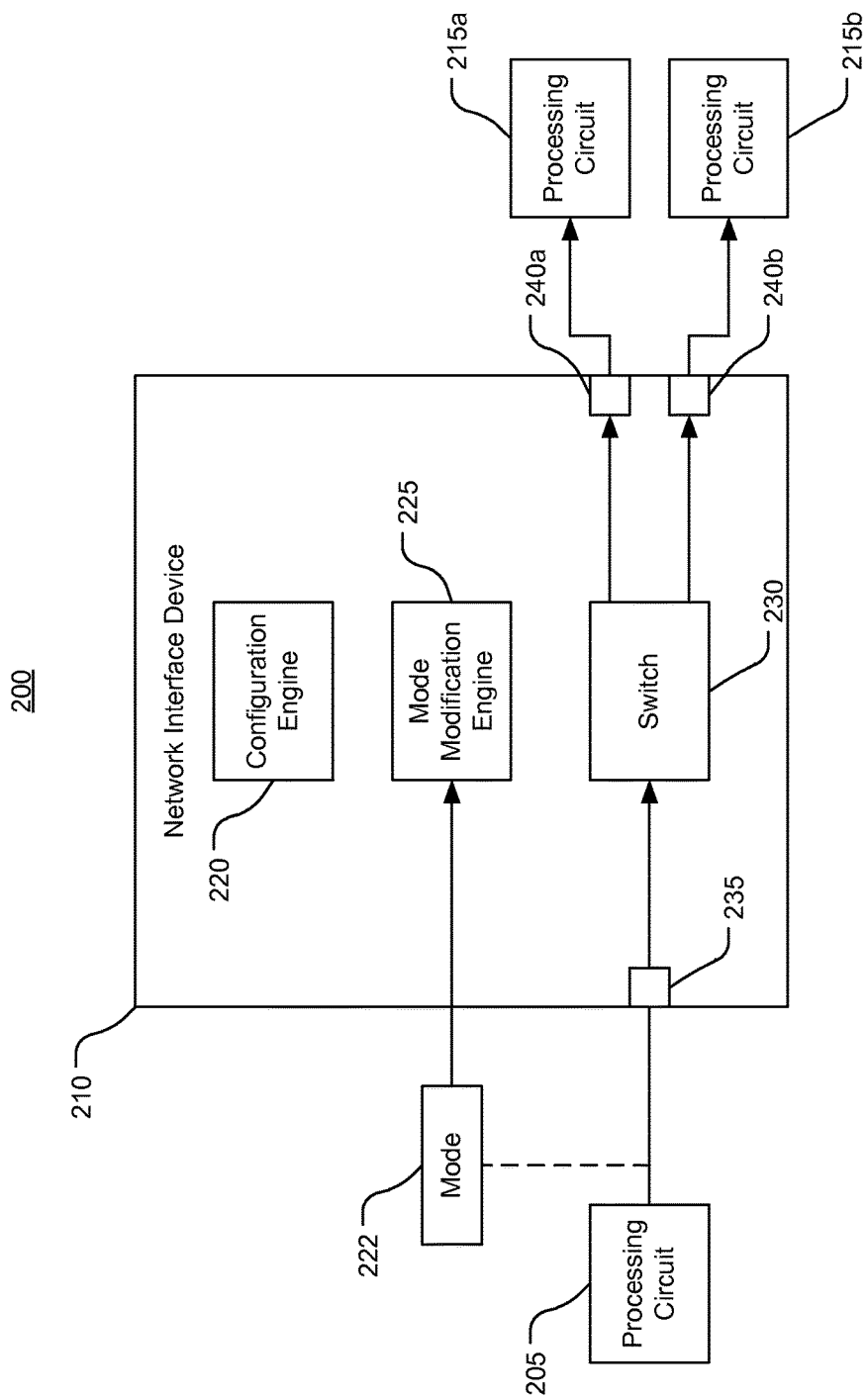
FIG. 2 is a block diagram of an exemplary embodiment of a system including a network interface device for modified network routing based on modal information according to the inventive concepts disclosed herein.

Referring now to FIG. 2, a block diagram of a system 200 is shown according to an exemplary embodiment of the inventive concepts disclosed herein. The system 200 may be configured to implement modified network routing based on modal information. Briefly, in some embodiments, the system 200 includes a first processing circuit 205, a network interface device 210, and a plurality of second processing circuits 215a, 215b. The first processing circuit 205 an second processing circuits 215a, 215b may incorporate features of the various devices 112-132 described with reference to FIG. 1. The network interface device 210 may incorporate features of the network interface device 110 described with reference to FIG. 1.

The processing circuits 205, 215a-b (e.g., control circuits, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein. The network interface device 210 may include similar electronic hardware as the processing circuits 205, 215a-215b, such as for executing the processes described with reference to configuration engine 220 and mode modification engine 225.

The first processing circuit 205 is configured to generate one or more first data packets. The first data packets may be configured for communication to one or more second processing circuits 215a, 215b. The first data packets may be configured according to an Ethernet-based protocol. The first data packets may be configured as an Ethernet frame.

The first processing circuit 205 may be communicatively coupled to the network interface device 210. The first processing circuit 205 may be configured to transmit multiple sets of one or more data packets (e.g., first data packet(s), second data packet(s), third data packet(s)), which may each individually or collectively be transmitted on modified network pathways according to the inventive concepts disclosed herein. The first processing circuit 205 may be configured to receive one or more data packets from the second processing circuit(s) 215a, 215b.

The network interface device 210 can be configured to modify routing of the first data packets to one or more second processing circuits 215a, 215b based on modal information. In some embodiments, the network interface device 210 includes a configuration engine 220, a mode modification engine 225, and a switch 230, which may be configured to execute the functions of the network interface device 210 as described herein. The switch 230 may be connected to or associated with a first communications interface 235 for receiving the first data packets from the first processing circuit 205, and second communications interfaces 240a, 240b for transmitting first data packets to the second processing circuits 215a and/or 215b. It will be appreciated that the communications interfaces 235, 240a, 240b may be configured as components of the switch 230, as physical interfaces to the network interface device 210, as logical interfaces, or otherwise configured to connect the processing circuits 205, 215a, 215b to the network interface device 210. The communications interfaces 235, 240a, 240b may be configured to communicate data packets according to an Ethernet-based protocol.

In some embodiments, the configuration engine 220 defines a static routing configuration for communicating first data packets from the first processing circuit 205 along a network pathway to a predetermined one or more of the second processing circuits 215a, 215b. The configuration engine 220 may define the static routing configuration in a configuration file. As shown in FIG. 2, the network pathway includes a path connecting the first communications interface 235 via the switch 230 to each of the second processing circuits 215a, 215b via second communications interfaces 240a, 240b. As will be described below with reference to FIGS. 3A-3G, the network pathways between the first processing circuit 205 to one or more second processing circuits 215a, 215b may be modified to various arrangements based on modal information. The static routing configuration can define explicit network routing pathways between the first processing circuit 205 and the second processing circuits 215a, 215b, such as to connect the first processing circuit 205 (e.g., including an application being executed on the first processing circuit 205) to one or more second processing circuits 215a, 215b (e.g., to communicate data packets from the application being executed on the first processing circuit 205 to application(s) being executed on the second processing circuit(s) 215a, 215b).

The static routing configuration defined and/or stored by the configuration engine 220 can include one or more mode settings associating with network pathways. For example, the configuration engine 220 can include a database, lookup table, or other mapping which associates mode settings with network pathways. The static routing configuration may include one or more modes corresponding to network pathways or arrangements of network pathways, such that the static routing configuration may remain static (e.g., predefined, predetermined), but the network pathways corresponding to the static routing configuration may be modified to other static (e.g., predefined, predetermined) network pathways.

In some embodiments, the static routing configuration includes or is determined based on a plurality of mode bits. The configuration engine 220 can include, store, or define predetermined networking modes which correspond to arrangements of one or more of the plurality of mode bits. Each arrangement may include a set of states (e.g., ON/OFF, TRUE/FALSE, 1/0) of each of the mode bits. For example, an arrangement of four mode bits {a, b, c, d} may be {a=1, b=1, c=0, d=1}. The arrangements of mode bits may be used by the network interface device 210 to select from one or more static network pathways of the static routing configuration.

In some embodiments, at least one mode bit is configured to turn on or off (e.g., enable/disable) a particular connection between the first processing circuit 205 and appropriate second processing circuit(s) 215a, 215b. In some embodiments, at least one mode bit is configured to turn on or off (e.g., enable/disable) communication of data packets of a particular traffic type (e.g., based on content of the data packets). For example, the plurality of mode bits may include at least one of a first one or more mode bits corresponding to networking modes or a second one or more mode bits corresponding to specific second processing circuit(s) 215a, 215b (or the corresponding communications interfaces 240a, 240b).

A first arrangement of mode bits may correspond to a normal or default networking mode, such as for allowing standard communication between processing circuits 205, 215a, 215b. In some embodiments, the normal mode allows for ARINC 661 protocol communication. For example, in the first arrangement of mode bits, each mode bit may be set to an ON state. A second arrangement of mode bits may correspond to a dataload mode. In some embodiments, a dataload data packet is associated with electronic transmission of software to electronic hardware (e.g., second processing circuits 215a, 215b). The dataload data packets may be configured to transmit executable software instructions to be executed in hardware installed in an airborne platform. The dataload mode may be configured to only allow dataload data packets to be communicated—for example, the mode bits may include a dataload mode bit which is set to ON, while the remaining mode bits are set to OFF, such that the network interface device 210 can extract a data type or other indication of mode from the first data packets and either transmit the first data packets to one or more second processing circuit(s) 215a, 215b if the data type indicates a dataload data type, or discard the first data packets if the data type does not indicate a data type. As such, in various embodiments, the arrangements of mode bits may be used such that mode bits determine whether the first processing circuit 205 can transmit first data packets to particular second processing circuit(s) 215a, 215b, and/or the arrangement of mode bits may be used such that mode bits determine how particular types of traffic (data packets) are communicated depending on the data type.

In some embodiments, the static routing configuration (e.g., one or more static network pathways) may be associated with virtual links, which may be implemented according to an ARINC 664 protocol (e.g., ARINC 664p7 network protocol). For example, the switch 230 can be configured to establish, store, generate, or otherwise provide virtual links between the first processing circuit 205 and one or more second processing circuit(s) 215a, 215b. In some embodiments, a virtual link defines a connection from the first processing circuit 205 to one or more of the second processing circuit(s) 215a, 215b. The connection may be at least one of unidirectional or logical. The switch 230 can be configured to transmit first data packets from the first processing circuit 205 to one or more second processing circuit(s) 215a, 215b along virtual links of the static routing configuration.

In some embodiments, the first processing circuit 205 can be configured to generate the one or more first data packets to include a header identifying a desired virtual link, which may allow the first processing circuit 205 (e.g., applications being executed by the first processing circuit 205) to identify a selected one or more second processing circuit(s) 215a, 215b as the destination(s) of the first data packet(s). As will be discussed herein, the network interface device 210 can be configured to route the first data packet(s) to other destinations(s) (e.g., via virtual links or via other connections of the switch 230), such as by modifying the network pathway.

In some embodiments, the mode modification engine 225 is configured modify the network pathway. For example, the mode modification engine 225 can cause the static routing configuration of the configuration engine 220 to change modes (e.g., change arrangements of mode bits). The mode modification engine 225 can cause the switch 230 to modify the routing of data packets between the first processing circuit 205 and one or more second processing circuits 215a, 215b (as well as to enable or disable discarding of data packets). The mode modification engine 225 can cause the switch 230 to retrieve a particular static routing configuration (or mode thereof) and enable a corresponding network pathway based on the retrieved static routing configuration.

The mode modification engine 225 can be configured to modify the network pathway based on an indication of a networking mode. For example, the mode modification engine 225 can set the plurality of mode bits to an arrangement corresponding to the indication of the networking mode (e.g., by causing the switch 230 to retrieve the arrangement corresponding to the indication of the networking mode).

In some embodiments, the network interface device 210 is configured to determine the indication of the networking mode based on the first data packets. For example, as shown by the dashed line in FIG. 2, the mode modification engine 225 can extract a mode 222 from the one or more first data packets. In some embodiments, the mode modification engine 225 is configured to extract the mode 222 by extracting information (e.g., mode words or other portions of the one or more first data packets), and identify the indication of the networking mode based on the extracted information. The mode modification engine 225 may include a database mapping mode words to networking modes, such that the mode modification engine 225 can retrieve the indication of the networking mode from the database based on the extracted information.

In some embodiments, the indication of the networking mode includes at least one of a maintenance mode or a test mode. For example, the system 200 may be configured to allow communications to or from maintenance terminals, such as a portable maintenance access terminal, which may be configured to execute tests on components of the airborne platform. Maintenance operations on the airborne platform may require access to (e.g., the ability to transmit data packets including executable instructions to) critical aircraft components, such as trusted sensors, avionics controllers, or other devices for which there may be a desire to access under secure conditions, such as maintenance operations, but which there may be a desire to restrict access to under unsecure conditions, such as during flight. Whereas in existing systems implementing static routing configurations, a dataload or reset to load may be required to facilitate a maintenance mode, in various embodiments as described herein, the network interface device 210 can facilitate secure switching to maintenance and/or test modes without downtime requiring shutdown or reset of various avionics systems.

In some embodiments, the maintenance mode and/or test mode may be configured to enable access to particular second processing circuit(s) 215a, 215b, which may be restricted from access in normal (e.g., default) modes. For example, the configuration engine 220 can define a first arrangement of mode bits for normal operation in which a mode bit for connecting maintenance terminals to other avionics system and/or for allowing test application data packets to be communicated through the network interface device 210 is set to an OFF state, and a second arrangement of mode bits for at least one of a maintenance mode or a test mode in which the mode bit is set to an ON state. In some such embodiments, the use of a maintenance and/or test mode may improve security of the system 200 by disabling maintenance and test application execution and data transmissions when not needed (e.g., maintenance and/or test execution and transmissions may be enabled according to specific conditions, such as OnGround&SafeToTest or OnGround&SafeToLoad). In some embodiments, the indication of at least one of the maintenance mode or the test mode (e.g., OnGround, Weight On Wheels) may be received from a landing system, such as a landing gear system or strut. In some embodiments, the indication of at least one of the maintenance mode or the test mode (e.g., SafeToTest, SafeToLoad) may be received from a cockpit avionics system, such as a safety interlock function implemented by a cockpit avionics system.

In some embodiments, the indication of the networking mode can be associated with a fault condition. For example, the network interface device 210 can detect or receive an indication that one or more second processing circuits 215a, 215b have failed (e.g., based on error signals received from the failed processing circuit, based on a timeout of a timer waiting for a response from the failed processing circuit). The mode modification engine 225 can be configured to select a modified network pathway configured to disable connections to the failed processing circuit. Selecting the modified network pathway may include enabling a different processing circuit to receive first data packets from the first processing circuit 205.

The network interface device 210 can be configured to allocate computational resources of the one or more second processing circuits 215a, 215b. For example, the mode modification engine 225 can receive an indication of resource usage (e.g., how much memory is being allocated to execute applications) from the one or more second processing circuits 215a, 215b, identify available resources of another of the one or more second processing circuits 215a, 215b (e.g., memory available for executing applications is more than a threshold value), and determine whether to reallocate application execution to a new selected second processing circuit 215 based on the indication of resource usage and the available resources (e.g., by applying a resource allocation policy). Responsive to determining to reallocate application execution, the mode modification engine 225 can select a predetermined network pathway to connect the first processing circuit 205 to the new selected second processing circuit 215.

The indication of the networking mode may include a state of the airborne platform. For example, the indication of the networking mode may be associated with a physical discrete state of the airborne platform received or detected by the network interface device 210 (e.g., Weight-On-Wheels, Safe-To-Load, Safe-To-Test).

In some embodiments, the switch 230 can be configured to enable (e.g., activate, select) predetermined network pathways by enabling or disabling specific communications interfaces 235, 240a, 240b. The switch 230 can also enable or disable a discard (e.g., determine to not transmit first data packets to second processing circuit(s) 215a, 215b, transmit first data packets to a discard, transmit first data packets to a quarantine) as part of enabling or disabling communications interfaces 235, 240a, 240b. For example, a first network pathway (which may correspond to a first networking mode and/or a first arrangement of mode bits) may include a connection from the first processing circuit 205 to both second processing circuits 215a, 215b in which all three of the communications interfaces 235, 240a, 240b are enabled, while a second network pathway may include a connection from the first processing circuit 205 to the second processing circuit 215a but not the second processing circuit 215b in which the communications interface 240b is not enabled.

The switch 230 is configured to communicate one or more first data packets from the first processing circuit 205 to appropriate second processing circuit(s) 215a, 215b. The switch 230 can be configured to communicate the first data packets to a modified one or more second processing circuit(s) 215a, 215b, or to discard the first data packets based on the indication of the networking mode.

In some embodiments, the system 200 includes an intrusion detection system (e.g., an intrusion detection system including the second processing circuit 215a). The intrusion detection system can be configured to identify an intrusion or other security threat to the system 200 or other networked electronics of an airborne platform. In response to detecting the intrusion, the intrusion detection system can generate an indication of networking mode which is configured to cause the network interface device 210 to modify the network pathway to disable communication of first data packets (e.g., disable the first communications interface 235, discard the first data packets). The intrusion detection system can be configured to cause the network interface device 210 to modify a virtual link from the first processing device 205 to one or more of the second processing circuits 215a, 215b based on the identified intrusion. In some embodiments, the intrusion detection system is configured to identify the intrusion based on monitoring the first data packets, and cause the network interface device 210 to modify the network pathway to disable communication of the first data packets (e.g., the first processing circuit 205 may be the source of the intrusion). In some embodiments, the intrusion detection system is configured to identify the intrusion based on monitoring the first data packets, and cause the network interface device 210 to modify the network pathway to disable communication to various other processing circuits (e.g., disabling one or more second communication interfaces 240). This may allow for at least one of isolation of the intrusion associated with the first data packets or lock down of various avionics systems, for example until such time as the intrusion is remedied. In some embodiments, the network interface device 210 is configured to modify the network pathway to disable communication to or from the first processing circuit 205 as well as second processing circuits 215 associated with critical systems, or otherwise selectively disable networking of processing circuits so that some operations of the airborne platform may be continued even as an intrusion is occurring. In some embodiments, the intrusion detection system is configured to generate the indication of the networking mode based on a control signal received from a physical switch in the airborne platform (e.g., a switch in a cockpit or aircraft control center).

Referring now to FIGS. 3A-3G, various embodiments of configurations of the network interface device 210 and corresponding arrangements of static routing configuration mode bits are shown according to the inventive concepts disclosed herein. The configurations of the network interface device 210 can incorporate features of the system 200 as described with reference to FIG. 2, including the processing circuit 205 and one or more second processing circuits 215a-215n (e.g., any number of second processing circuits). The network interface device 210 can be configured to receive one or more first data packets from the first processing circuit 205, and transmit the one or more first data packets to one or more second processing circuits 215a-215n depending on a network pathway of a static routing configuration; first data packets may also be discarded at 305 (e.g., not transmitted to any processing circuit; transmitted to the discard 305). The network interface device 210 can include the first communications interface 235 configured to receive the one or more first data packets from the first processing circuit 205, and one or more second communications interfaces 240a-240n configured to transmit the one or more first data packets to corresponding respective second processing circuits 215a-215n.

As will be described herein, the configurations 300a-300g of FIGS. 3A-3G can be implemented based on the network interface device 210 detecting a data type of the one or more first data packets and causing a static network pathway of the static routing configuration to be modified based on the detected data type, such as by modifying operation of communications interfaces 240a-240n (e.g., as described with reference to FIG. 2, communications interfaces which may be included in or associated with the switch 230). The configurations 300a-300g can be implemented by enabling or disabling communications interfaces 240a-240n. Such features may similarly be implemented based on modifying virtual links between the first processing circuit 205 and the one or more second processing circuits 215a-215n. In some embodiments, the mode bits may include a zeroth mode bit associated with normal data packets (e.g., default, ARINC-661 or other avionics Ethernet protocol data type), a first mode bit associated with dataload data packets, and a second mode bit associated with at least one of a maintenance or test mode. The network interface device 210 may additionally or alternatively include mode bits corresponding to specific communications interfaces 240a-240n, which may allow direct, selectable enabling/disabling of transmission of data packets to selected second processing circuits 215a-215n.

Figure 3A:
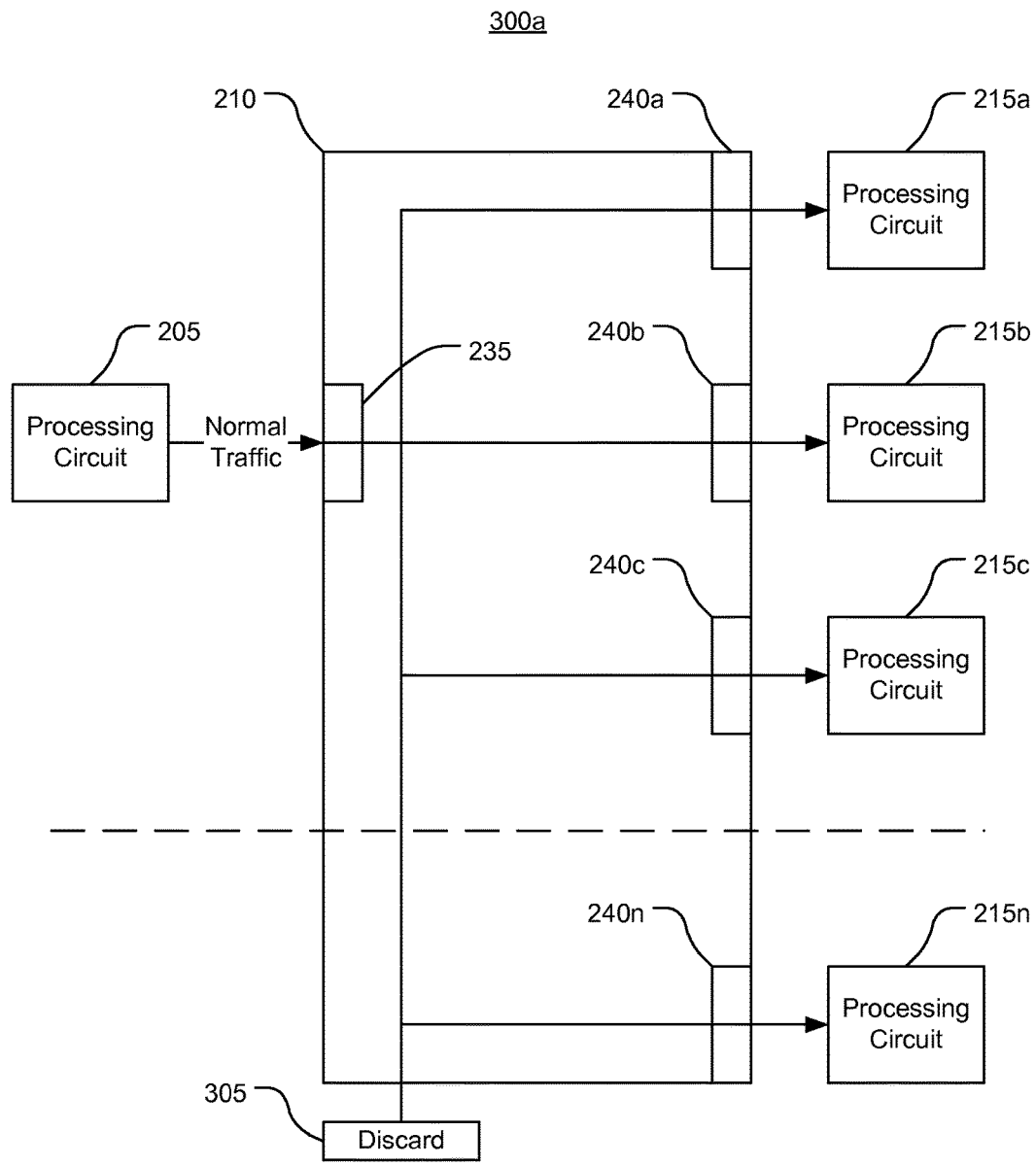
FIGS. 3A-3G are block diagrams of an exemplary embodiments of network routing configurations which can be modified based on modal information according to the inventive concepts disclosed herein.

As shown in FIG. 3A, in a first configuration 300a, the static routing configuration includes a static network pathway connecting the first processing circuit 205 to each of the second processing circuits 215a-215n. The zeroth mode bit, the first mode bit, and the second mode bit are each set to an ON state. The network interface device 210 can detect the data type of the one or more first data packets to be a normal type, determine that the zeroth mode bit associated with normal data packets is set to the ON state, and responsive to the detection and determination, transmit the one or more first data packets to any of the second processing circuits 215a-215n (e.g., based on a destination address of the one or more first data packets). In some embodiments, normal data type data packets, such as ARINC 661 data packets, may be allowed in all modes.

Figure 3B:
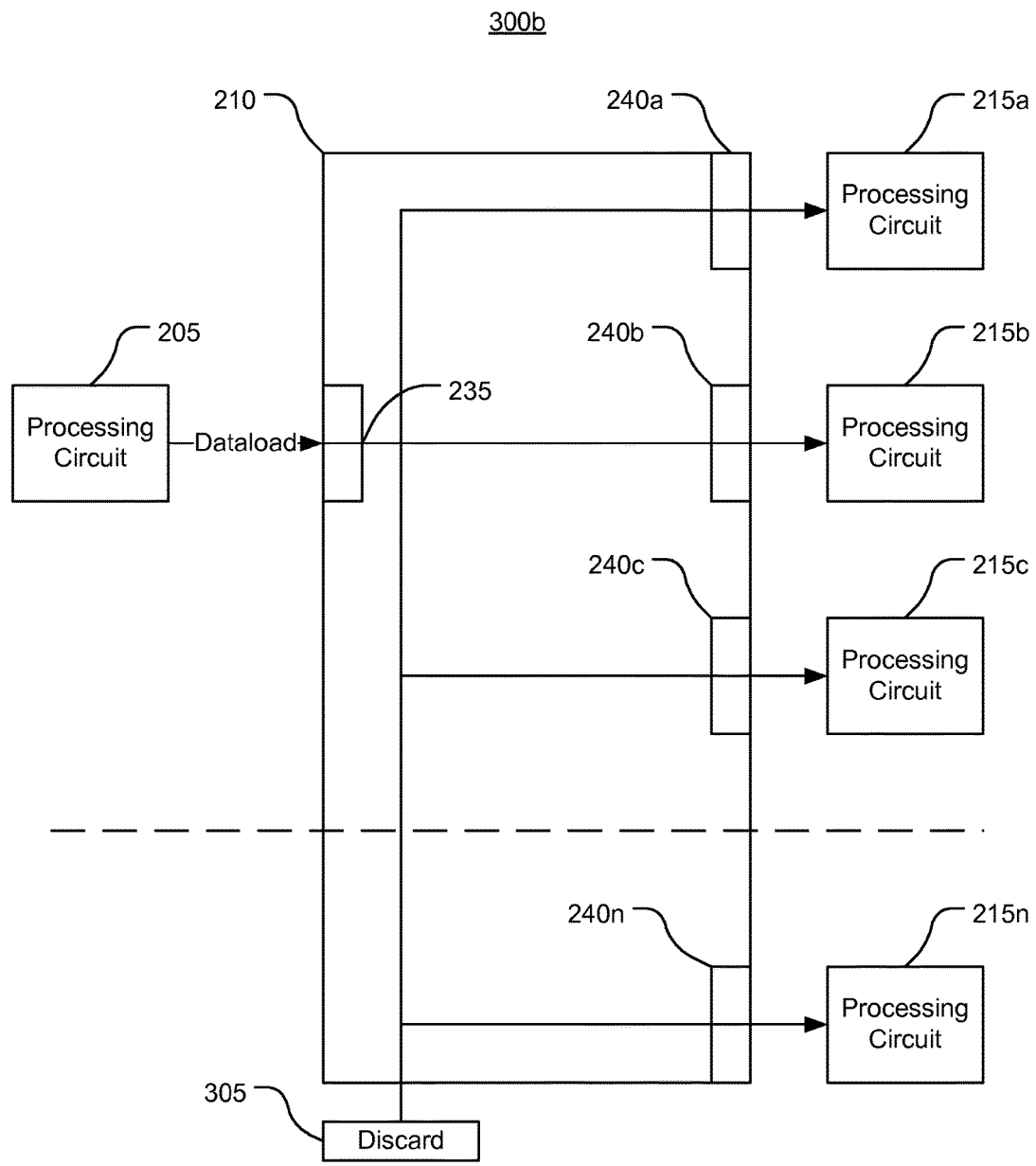

As shown in FIG. 3B, in a second configuration 300b, the static routing configuration also includes a static network pathway connecting the first processing circuit 205 to each of the second processing circuits 215a-215n, and the zeroth mode bit, the first mode bit, and the second mode bit are also each set to an ON state. The network interface device 210 can detect the data type of the one or more first data packets to be a dataload type, determine that the first mode bit associated with dataload data packets is set to the ON state, and responsive to the detection and determination, transmit the one or more first data packets to any of the second processing circuits 215a-215n (e.g., based on a destination address of the one or more first data packets).

Figure 3C:
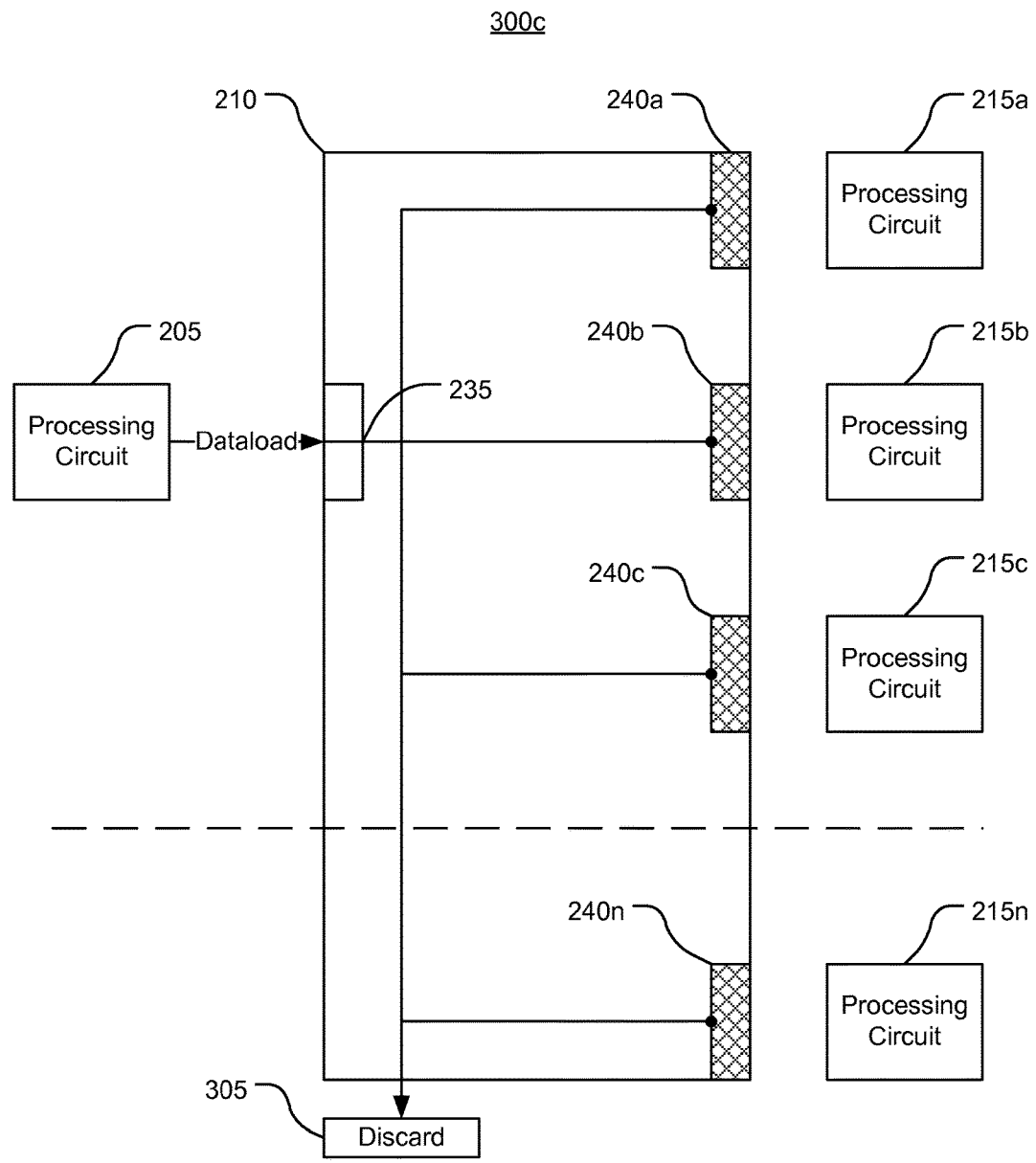

As shown in FIG. 3C, in a third configuration 300c, the static routing configuration also includes a static network pathway connecting the first processing circuit 205 to each of the second processing circuits 215a-215n. The zeroth mode bit and second mode bit are set to the ON state, while the first mode bit (associated with dataload data packets) is set to the OFF state. The network interface device 210 can detect the data type of the one or more first data packets to be a dataload type, determine that the first mode bit is set to the OFF state, and responsive to the detection and determination, not transmit the one or more first data packets to any of the second processing circuits. For example, the network interface device 210 can disable the second communications interfaces 240a-240n and/or discard the one or more first data packets at 305.

Figure 3D:
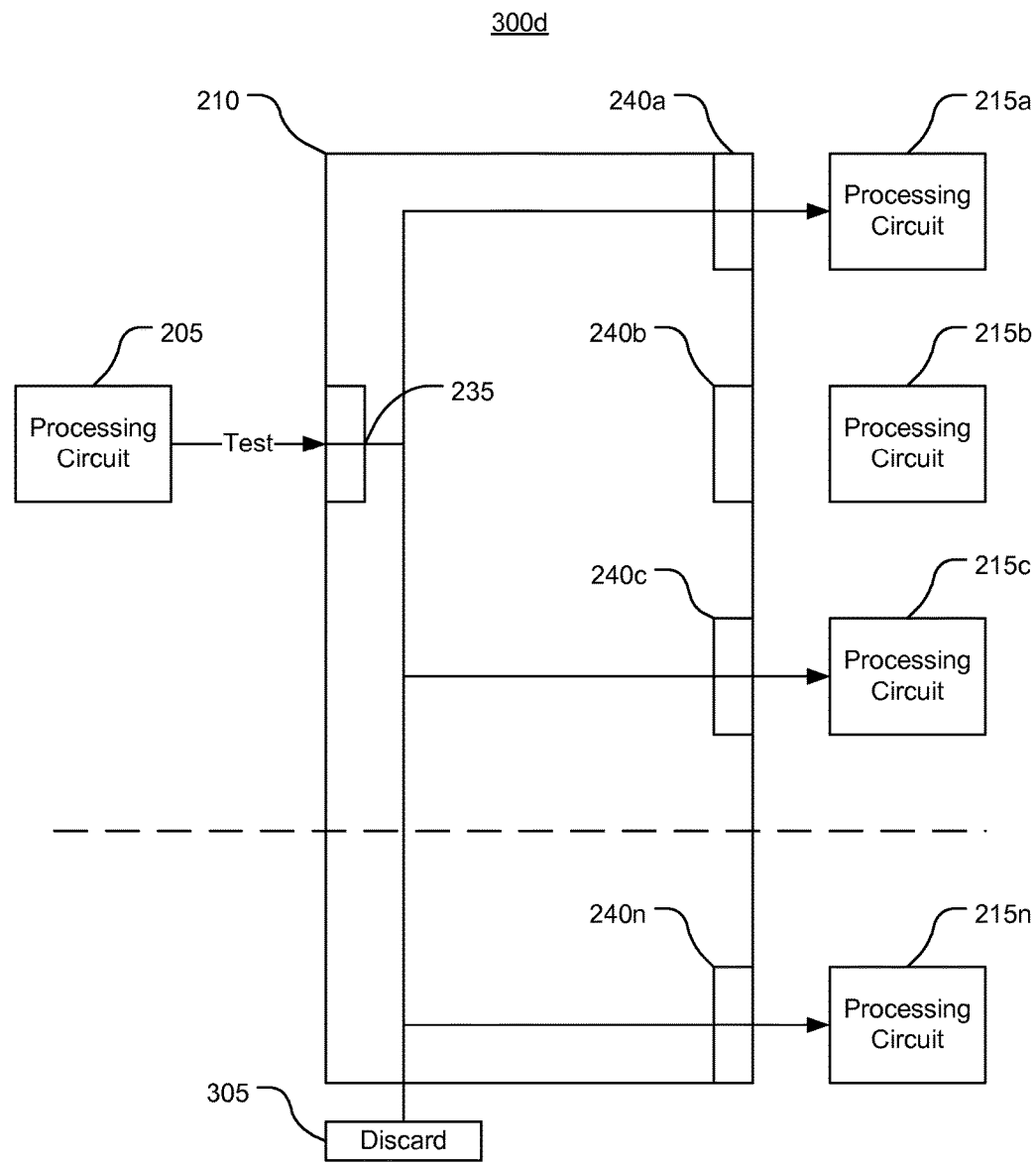

As shown in FIG. 3D, in a fourth configuration 300d, the static routing configuration includes a static network pathway connecting the first processing circuit 205 to the second processing circuits 215a, 215c, and 215n, but not second processing circuit 215b. For example, the static network pathway may include virtual links to from the first processing circuit 205 the second processing circuits 215a, 215c, and 215n, but not second processing circuit 215b. The zeroth mode bit and second mode bit are set to the ON state, while the first mode bit is set to the OFF state. The network interface device 210 can detect the data type of the one or more first data packets to be a test type, determine that the second mode bit is set to the ON state, and responsive to the detect and determination, transmit the one or more first data packets to any of the second processing circuits 215a, 215c, or 215n.

Figure 3E:
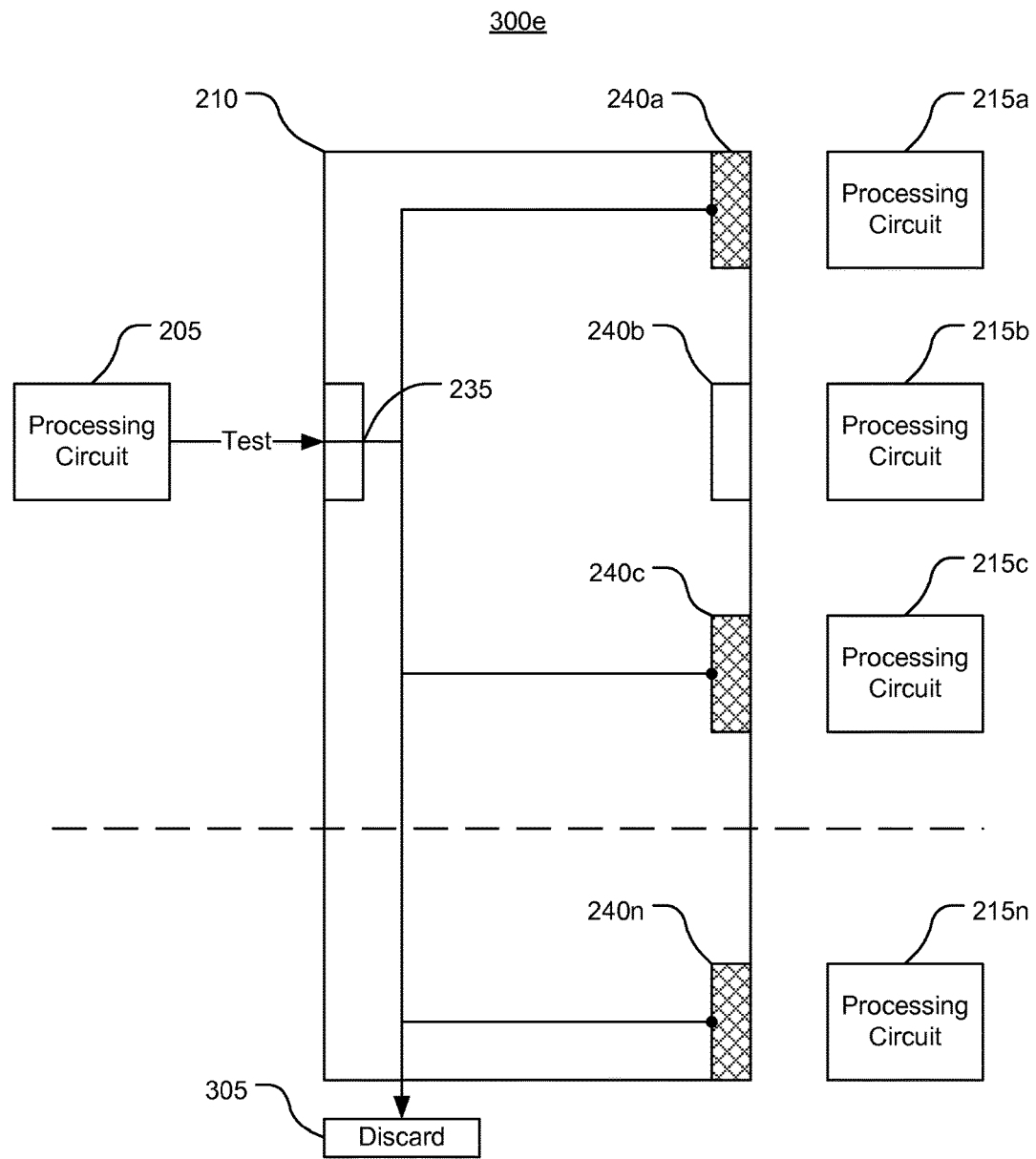

As shown in FIG. 3E, in a fifth configuration 300e, the static routing configuration includes a static network pathway connecting the first processing circuit 205 to the second processing circuits 215a, 215c, and 215n, but not second processing circuit 215b. For example, the static network pathway may include virtual links to from the first processing circuit 205 the second processing circuits 215a, 215c, and 215n, but not second processing circuit 215b. The zeroth mode bit is set to the ON state, while the first mode bit and second mode bits are set to the OFF state. The network interface device 210 can detect the data type of the one or more first data packets to be a test type, determine that the second mode bit is set to the OFF state, and responsive to the detect and determination, not transmit the one or more first data packets to any of the second processing circuits 215a, 215c, or 215n. For example, the network interface device 210 can disable the second communications interfaces 240a, 240c, 240n and/or discard the one or more first data packets at 305.

Figure 3F:
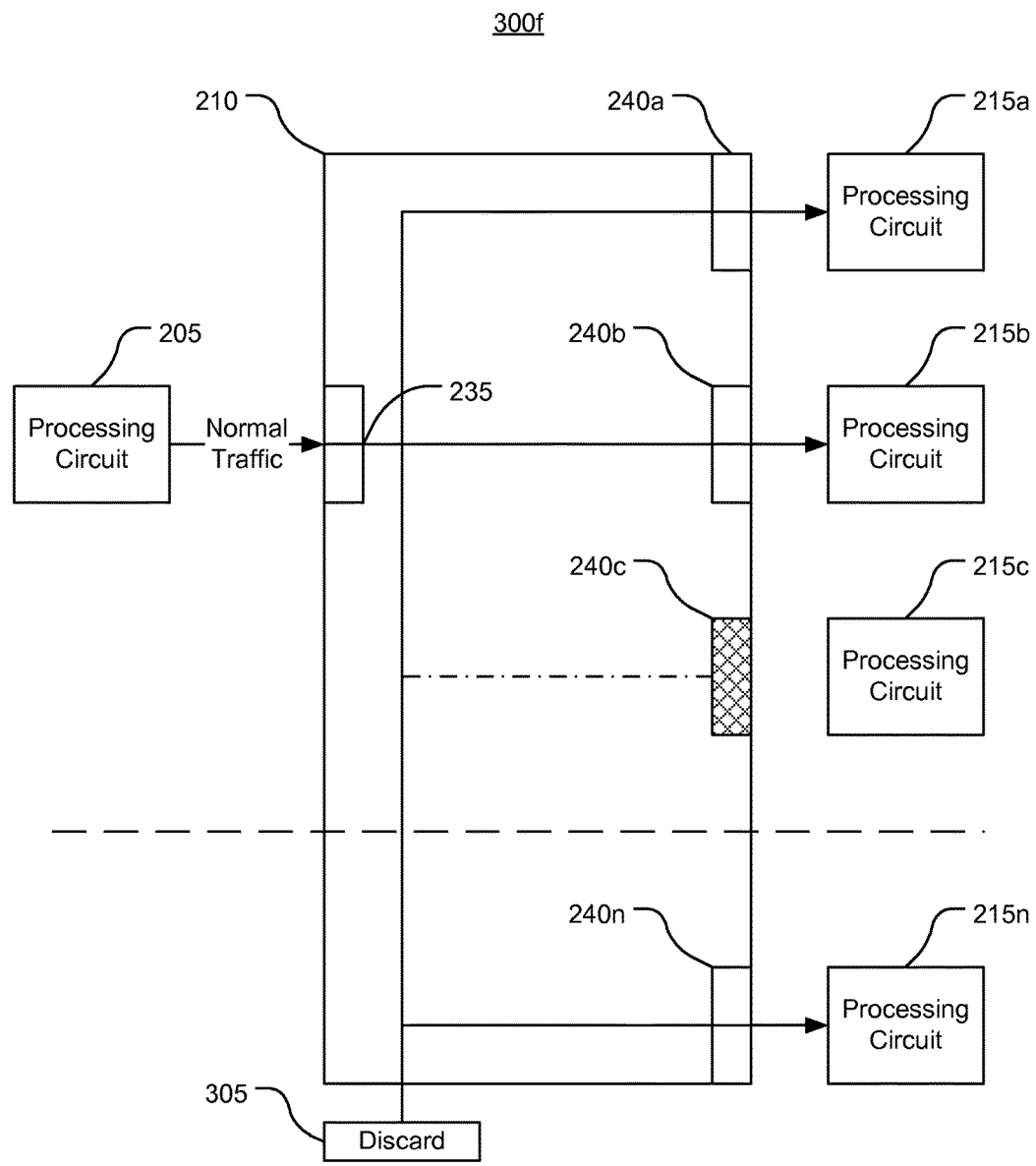

As shown in FIG. 3F, in a sixth configuration 300f, the static routing configuration can be modified (e.g., as compared to the first configuration 300a) based on an indication of a networking mode. The indication of the networking mode may indicate at least one of a fault condition or a resource deficiency condition of the second processing circuit 215c. Based on the indication of the networking mode, the network interface device 210 can be configured to at least one of disable the communications interface 240c or modify the static network pathway to the second processing circuit 215c to be disabled (as indicated by the dot-dashed line), such as by disabling a virtual link from the first processing circuit 205 to the second processing circuit 215c (e.g., the network interface device 210 can be configured to determine that the destination address of the one or more first data packets identifies the second processing circuit 215c, determine that the second processing circuit 215c should not receive the one or more first data packets based on the indication of the networking mode, and modify the virtual link(s) to transmit the one or more first data packets to a different second processing circuit).

Figure 3G:
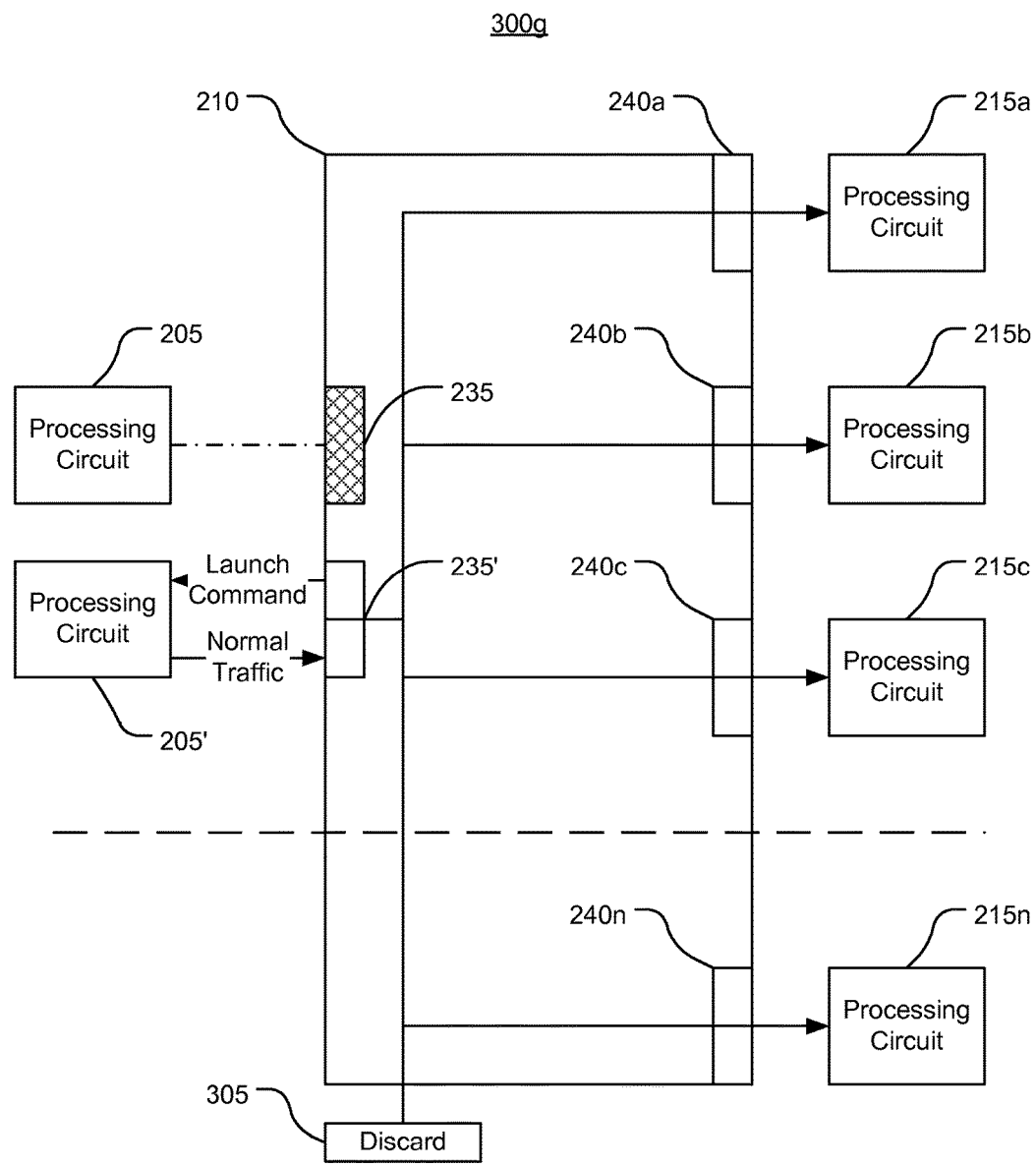

As shown in FIG. 3G, in a seventh configuration 300g, the static routing configuration can be modified based on an indication of a networking mode indicating failure of the first processing circuit 205. For example, the first processing circuit 205 may be executing an application which generates the first data packets. If the first processing circuit 205 fails (e.g., as illustrated by the dot-dashed line from the first processing circuit 205 to the first communications interface 235), the network interface device 210 can be configured to transmit a launch command to a first processing circuit 205', the launch command configured to cause the first processing circuit 205' to execute the application to generate the first data packets instead of the failed first processing circuit 205. In some embodiments, the network interface device 210 can be configured to enable a first communications interface 235' for receiving the first data packets generated by the first processing circuit 205'. In some embodiments, the network interface device 210 can be configured to disable the first communications interface 235 to prevent communication from the failed first processing circuit 205 (e.g., if the failure of the first processing circuit 205 is associated with a security failure of the first processing circuit 205). In various embodiments such as shown in FIG. 3G, the network interface device 310 can thus be configured to seamlessly continue execution of applications even if a static routing configuration is not initially set to enable the appropriate networking connections between necessary processing circuits.

Figure 4:
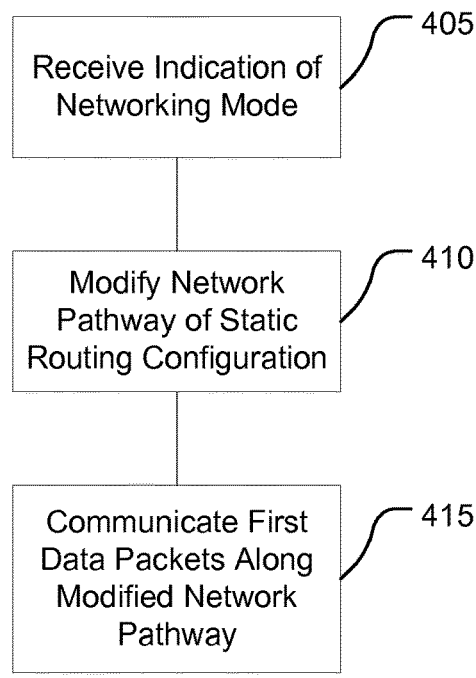
FIG. 4 is a diagram of an exemplary embodiment of a method for modified network routing based on modal information according to the inventive concepts disclosed herein.

Referring now to FIG. 4, an exemplary embodiment of a method 400 according to the inventive concepts disclosed herein may include the following steps. The method 400 may be executed using various hardware, apparatuses, and systems disclosed herein, such as the systems 100, 200, the various configurations 300a-300g, and/or components or features thereof.

A step (405) may include receiving, at a network interface device, an indication of a networking mode. The networking mode may include a normal or default mode (e.g., for communicating according to standard avionics protocols, such as the ARINC 661 protocol). The networking mode may include at least one of a maintenance mode or a test mode. The networking mode may include a dataload mode. The networking mode may be associated with a fault condition or a resource deficiency condition of a destination device. The networking mode may be associated with a state of an airborne platform. The indication of the networking mode may be determined based on mode words of one or more first data packets. The indication of the networking mode may include an indication of an intrusion generated by an intrusion detection system.

A step (410) may include modifying a network pathway of a static routing configuration of the network interface device based on the indication of the networking mode. The static routing configuration may provide a connection for communicating first data packets from a first processing circuit to a predetermined one or more second processing circuits. Modifying the network pathway may include enabling or disabling communications interfaces to the one or more second processing circuits, including disabling communications interfaces to one or more of the predetermined one or more second processing circuits, or enabling communications interfaces to other second processing circuits. Modifying the network pathway may include modifying virtual links between the first processing circuit and the one or more predetermined second processing circuits. Modifying the network pathway may include setting a plurality of mode bits to an arrangement corresponding to the indication of the networking mode, where the plurality of mode bits may be used by the network interface device to determine if and how to connect the first processing circuit to the one or more second processing circuits.

A step (415) may include communicating the first data packets along the modified network pathway. Communicating the first data packets may include communicating the first data packets to a modified one or more second processing circuits or discarding the first data packets based on the indication of the network mode. The first data packets may be communicated according to an Ethernet-based protocol, such as the ARINC-661 protocol.

As will be appreciated from the above, systems and methods for a secured maintenance gateway and other secured avionics electronics according to embodiments of the inventive concepts disclosed herein may improve operation of aircraft and other platforms by allowing for the use of static routing configurations of avionics networking devices, such as for communicating according to Ethernet-based protocols with static routing configurations, while also providing the flexibility to dynamically allocate data packet transmission and other resources through the networking devices by modifying network pathways of the static routing configurations.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A network interface device, comprising:
one or more processors and memory storing computer-readable instructions that when executed by the one or more processors, cause the one or more processors to:
execute a configuration engine by defining a static routing configuration for communicating one or more first data packets received from a first processing circuit along a network pathway to a predetermined one or more second processing circuits; and
execute a mode modification engine by receiving an indication of a networking mode, determining the networking mode based on the indication of the networking mode, and responsive to determining the networking mode to include at least one of a test mode or a maintenance mode, modifying the network pathway to a test pathway based on the indication of the networking mode; and
a switch configured to:
identify a data type of the one or more first data packets to be at least one of a test type or a maintenance type;
responsive to the network pathway being modified to the test pathway, communicate the one or more first data packets along the network pathway to the predetermined one or more second processing circuits; and
responsive to the network pathway not being modified to the test pathway, not communicate the one or more first data packets to the predetermined one or more second processing circuits.

2. The network interface device of claim 1, wherein the switch is configured to discard the one or more first data packets based on the indication of the networking mode not including the at least one of the test mode or the maintenance mode.

3. The network interface device of claim 2, further comprising a first Ethernet-based communications interface configured to receive the first data packets and at least one second Ethernet-based communications interface configured to transmit the first data packets to a modified one or more second processing circuits corresponding to the network pathway modified to the test pathway.

4. The network interface device of claim 1, wherein:
the static routing configuration includes a plurality of mode bits, each of a predetermined one or more networking modes corresponding to an arrangement of the plurality of mode bits; and
the mode modification engine is configured to modify the network pathway by setting the plurality of mode bits to an arrangement corresponding to the indication of the networking mode.

5. The network interface device of claim 4, wherein the predetermined one or more networking modes includes a first networking mode for dataload operations corresponding to a first arrangement of the plurality of mode bits in which a first mode bit is set to an on state, a second networking mode corresponding to a second arrangement of the plurality of mode bits in which the first mode bit is set to an off state, wherein the switch is configured to discard first data packets corresponding to dataload operations based on the first mode bit being set to the off state.

6. The network interface device of claim 1, wherein the mode modification engine is configured to determine the indication of the networking mode based on mode words of the first data packets.

7. The network interface device of claim 1, wherein the indication of the networking mode is associated with a fault condition of at least one of the predetermined one or more second processing circuits.

8. The network interface device of claim 1, wherein the indication of the networking mode is associated with a state of an airborne platform.

9. The network interface device of claim 1, wherein the network pathway includes one or more virtual links connecting the first processing circuit to one or more corresponding second processing circuits.

10. The network interface device of claim 1, wherein the switch is further configured to communicate one or more second data packets received from the first processing circuit along the modified network pathway.

11. An airborne platform, comprising:
a first processing circuit configured to generate one or more first data packets;
a plurality of second processing circuits; and
a network interface device, comprising:
one or more processors and memory storing computer-readable instructions that when executed by the one or more processors, cause the one or more processors to:
execute a configuration engine by defining a static routing configuration for communicating the one or more first data packets from the first processing circuit to a predetermined one or more of the plurality of second processing circuits along a network pathway, the static routing configuration including a plurality of mode bits, each of a predetermined one or more networking modes corresponding to an arrangement of the plurality of mode bits, the predetermined one or more networking modes including a first networking mode for dataload operations corresponding to a first arrangement of the plurality of mode bits in which a first mode bit is set to an on state and a second mode bit is set to an on state, and second networking mode corresponding to a second arrangement of the plurality of mode bits in which the first mode bit is set to an on state and the second mode bit is set to an off state; and
execute a mode modification engine by receiving an indication of a networking mode and modifying the network pathway based on the indication of the networking mode; and
a switch configured to:
determine a data type of the one or more first data packets;
responsive to determining the data type to be a dataload type and the second mode bit being set to the on state, communicate the one or more first data packets along the network pathway; and
responsive to at least one of (i) determining the data type to be the dataload type and the second mode bit being set to the off state or (ii) determining the data type to not be the dataload type and the second mode bit being set to the on state, not communicate the one or more first data packets along the network pathway.

12. The airborne platform of claim 10, wherein the first processing circuit is associated with at least one of an aircraft control function or an aircraft flight parameter sensor.

13. The airborne platform of claim 10, wherein the indication of the networking mode includes at least one of a maintenance mode or a test mode.

14. The airborne platform of claim 10, further comprising an intrusion detection system configured to monitor the first data packets to identify an intrusion and generate the indication of the networking mode to cause the network interface device to modify the network pathway to disable communication of first data packets responsive to identifying the intrusion.

15. A method, comprising:
receiving an indication of a networking mode;
modifying a network pathway of a static routing configuration for communicating first data packets from a first processing circuit to a predetermined one or more second processing circuits based on the indication of the networking mode to a test pathway responsive to determining the networking mode to include at least one of a test mode or a maintenance mode;
identifying a data type of the one or more first data packets to be at least one of a test type or a maintenance type;
responsive to the network pathway being modified to the test pathway, communicating the first data packets along the modified network pathway to the predetermined one or more second processing circuits; and
responsive to the network pathway not being modified to the test pathway, not communicating the one or more first data packets to the predetermined one or more second processing circuits.

16. The method of claim 15, wherein:
the static routing configuration includes a plurality of mode bits, each of a predetermined one or more networking modes corresponding to an arrangement of the plurality of mode bits; and
modifying the network pathway includes setting the plurality of mode bits to an arrangement corresponding to the indication of the networking mode.

17. The method of claim 15, wherein the indication of the networking mode indicates failure of the first processing circuit, wherein the first processing circuit was executing an application to generate the first data packets prior to failure, wherein modifying the network pathway includes connecting a third processing circuit to the one or more second processing circuits and causing the third processing circuit to continue executing the application.

\* \* \* \* \*